AUTOMATIC FREQUENCY CONTROL SYSTEM

Filed Aug. 9, 1961

INVENTORS
Daniel J. Herick
Petrus A. Van Berkum
By Francis W. Crotty
Atty.

United States Patent Office 3,199,045

Patented Aug. 3, 1965

3,199,045

AUTOMATIC FREQUENCY CONTROL SYSTEM

Daniel J. Herick, Des Plaines, and Petrus A. van Berkum, Elmhurst, Ill., assignors to Zenith Radio Corporation, a corporation of Delaware Filed Aug. 9, 1961, Ser. No. 130,290
7 Claims. (Cl. 331—8)

The present invention pertains in general to a phase controlled system and has special application to phase controlled oscillation generators.

A phase controlled generator is customarily included in the horizontal scanning system of a television receiver in order to assure precise synchronization of the scanning functions in the receiver with the scanning functions of the transmitter radiating the program signal that is utilized by the receiver. Basically, the scanning system comprises an oscillator designed to operate at the nominal value of the horizontal-scanning frequency, a phase detector which measures the phase of the signal output of that generator in relation to the horizontal-synchronizing components of the received television signal, and a frequency controlling stage which responds to the output of the phase detector and adjusts the operating frequency of the horizontal oscillator to maintain a desired phase relation of the horizontal-scanning function and the received horizontal-synchronizing components.

A number of such arrangements have already been proposed and utilized in commercially available television receivers. The most common form utilizes a diode type phase detector having an integrating load circuit to develop the desired phase control potential. As thus far constructed, this system is entirely satisfactory for receivers utilizing vacuum tube oscillation generators but it does not accommodate itself universally to oscillation generators whether they be constructed of vacuum tube or transistor devices.

A quite different prior arrangement makes use of a three-element transistor as the phase responsive detector but, as constructed heretofore, requires a symmetrical transistor. A symmetrical transistor is a device in which each of the two electrodes corresponding to the emitter and collector of the ordinary transistor may function equally well as emitter or collector. It has been found that symmetrical transistors are difficult to produce and the symmetrical conductivity characteristic is attained only at the sacrifice of other desirable properties otherwise exhibited by a uni-lateral transistor device, where the expression "uni-lateral device" is intended to mean the conventional transistor in which conductivity from the emitter to the collector electrodes is greatly superior to conductivity in the obverse direction.

In using the symmetrical transistor in the phase-controlled horizontal system of a television receiver, a sawtooth signal corresponding to the deflection waveform is applied between emitter and collector electrodes and the horizontal sync signal or pulse is applied to the base electrode. The sync pulse biases the device toward conduction and the direction of current flow is determined by the relative phase of the sawtooth and sync signals. A condenser provided in the emitter-collector circuit is charged in a direction and amount which manifest the sense and extent of phase deviation of the two signals from a reference condition. The charge of the condenser represents a control voltage that may be utilized to control the horizontal-scanning oscillator to maintain the desired reference phase relation. Aside from the difficulties of attaining the symmetrical transistor, this arrangement has the further disadvantage that the emitter-collector leakage current is undesirably dependent upon temperature and therefore subject to variations which impair optimum performance of the phase detector.

Accordingly, it is an object of the invention to provide a phase controlled system which avoids one or more of the aforementioned difficulties and limitations of prior systems.

It is a specific object of the invention to provide a novel phase controlled system which is flexible in that it lends itself equally well to the control of an oscillation generator making use of a vacuum tube which is usually a high impedance device or a transistor which is generally a low impedance device.

It is a specific object of the invention to provide a novel phase controlled system utilizing a conventional, unilateral transistor device which may, through selection of its associated circuit parameters, present any desired impedance to the oscillation generator which it is intended to control.

A phase controlled system embodying the subject invention comprises a semiconductor device having a base zone of one conductivity interposed between emitter and collector zones of opposite conductivity, the meeting faces of these zones constituting the usual base-emitter and base-collector junctions. A first signal source produces an alternating current signal the phase of which is to be measured while a second source produces a signal to be used as a phase reference. There is a storage capacitor and a first signal path, including the first signal source and that capacitor connected in series with both the emitter and collector junctions, for charging the capacitor in one sense. A second path, including the first and second signal sources and the storage capacitor connected in series across only one, rather than both of the base-emitter and base-collector junctions, is provided for charging the capacitor in the opposite sense. The aforesaid second signal source is poled to cause conduction in the semiconductor so that current flows in one of those signal paths and in an amount determined by the sense and extent of deviation of the compared signals from the desired reference phase condition. A filter is provided for deriving from the capacitor a substantially direct current potential representing phase changes of the compared signals. In one aspect of the invention, a unilateral junction transistor is utilized and the storage capacitor may be selectively included in the emitter-collector circuit or, alternatively, in the collector-base circuit depending upon the phase of the compared signals at any particular interval of phase measurement.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figures 1, 2, 3, 4, 5A, 5B:
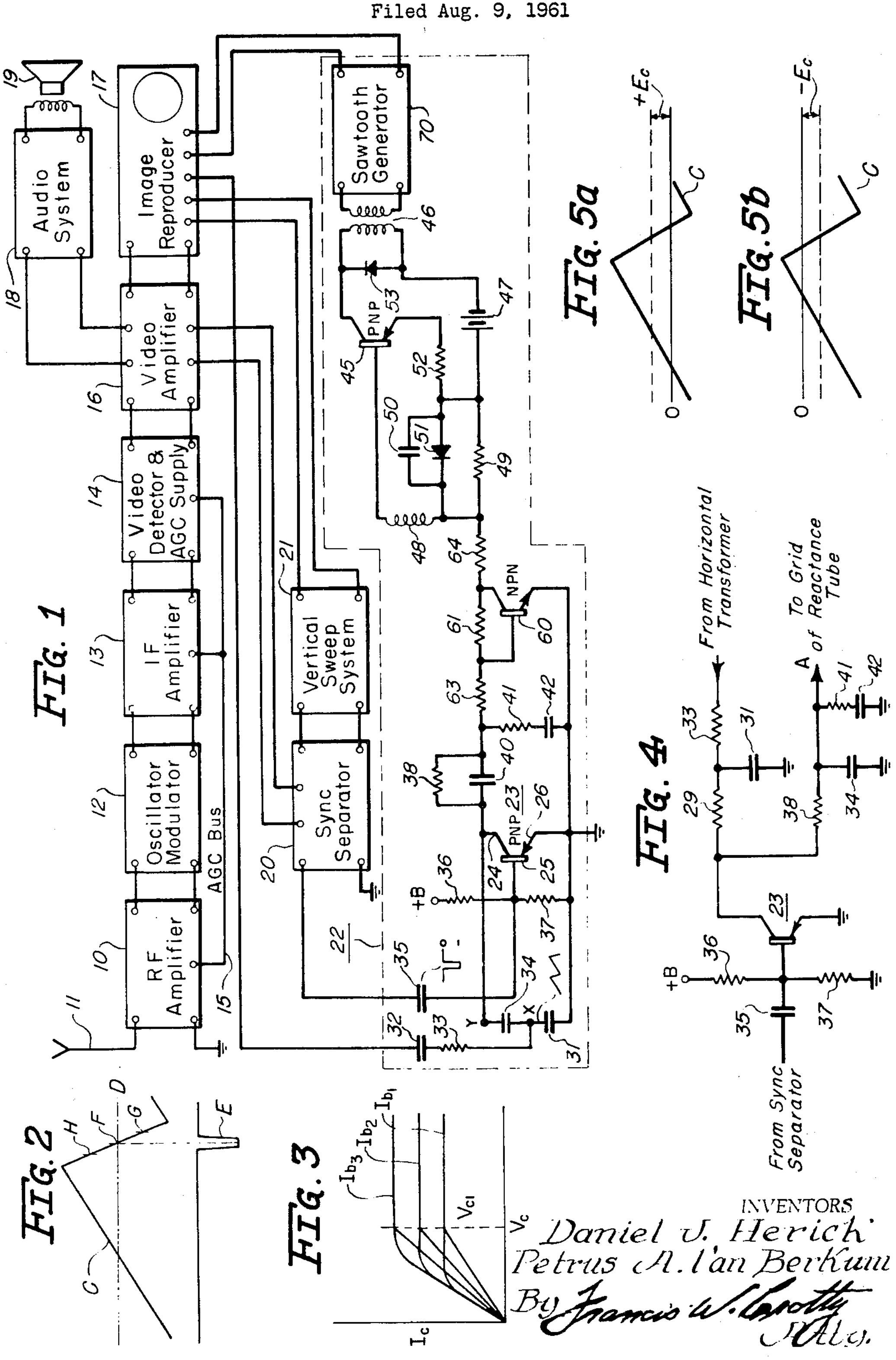
FIGURE 1 is a schematic representation of a television receiver utilizing a phase controlled system constructed in accordance with the invention.
FIGURES 2 and 3 are curves utilized in explaining certain operating features of the receiver.
FIGURE 4 is a modification of the phase detector arrangement of that receiver; and FIGURES *5a* and *5b* are curves used in explaining the operation of the modified form of detector.

Referring now more particularly to FIGURE 1, the television receiver there represented employs the phase controlled system of the subject invention in the horizontal-scanning system. As shown, the receiver comprises a radio-frequency amplifier 10 of any desired number of stages having input terminals connected with a suitable antenna 11. Coupled in cascade to radio-frequency amplifier 10 are an oscillator modulator 12, an intermediate-frequency amplifier 13 of any desired number of stages and a video detector and AGC supply 14. An AGC bus 15 applies a gain control potential from the AGC supply of unit 14 to radio-frequency and intermediate-frequency amplifiers 10 and 13. A video amplifier 16 is coupled to the output of the video detector of unit 14 and its output, in turn, is connected with the input of an image-reproducing device 17. Usually, this reproducing device is a cathode-ray tube and the video signal is applied to its control electrode and cathode circuit. Assuming the receiver to be of the intercarrier type, an audio system 18, terminated in a loud speaker 19, is connected to an intercarrier output of video amplifier 16.

Still another output of the video amplifier connects to a synchronizing-signal separator 20 having a vertical sync output connected to a vertical-sweep system 21 and having a horizontal sync output connected to the horizontal-sweep system enclosed within broken-line rectangle 22. The output terminals of these sweep systems connect with scanning signal inputs of image reproducer 17. Usually, magnetic deflection is employed with the cathode-ray reproducer in which case the sweep systems connect with the coils of a deflection yoke. Aside from the horizontal-sweep system 22, the receiver is entirely conventional in construction and operation.

Briefly, a television signal can be selected from antenna 11 by tuning of radio-frequency amplifier 10 and oscillator modulator 12. After radio-frequency amplification and conversion into the intermediate frequency of the receiver within oscillator modulator 12, the received signal is further amplified in intermediate-frequency amplifier 13 and detected in video detector 14. The video information is amplified in video amplifier 16 and applied to the input circuit of reproducer 17 to intensity modulate the cathode-ray beam thereof.

The detected composite video signal is also supplied through video amplifier 16 to synchronizing-signal separator 20 where its horizontal and vertical synchronizing components are separated and employed to synchronize the vertical- and horizontal-sweep systems 21 and 22. The scanning signals developed by those systems and applied to reproducer 17 deflect the beam thereof in a series of fields of parallel lines concurrently with the intensity modulation thereof in response to the video information to synthesize an image in the usual way. The AGC potential delivered over line 15 to amplifiers 10 and 13 serves to maintain the signal input to video detector 14 at a substantially constant amplitude.

Since intercarrier reception has been assumed, the intercarrier sound component developed by the beating of the video and sound carrier signals in video detector 14 is amplified in video amplifier 16 and there separated for delivery to audio system 18. It energizes that system to the end that speaker 19 reproduces the audio portion of the program concurrently with the picture display. More particular attention will now be directed to the horizontal-scanning system, especially to its phase control arrangement. Basically, the arrangement comprises a phase detector and a frequency controlled oscillator.

The phase detector comprises a semiconductor device 23 which will be assumed to be a conventional, unilateral three-junction transistor having a base zone 25 interposed between an emitter zone 26 and a collector zone 24. The base zone is of one type conductivity while the emitter and collector zones positioned on opposite sides thereof are of opposite conductivity to constitute therewith the usual base-emitter and base-collector junctions. More specifically, device 23 will be considered to be a PNP type of junction transistor.

There is a first signal source for producing an alternating current signal the phase of which is to be measured. In the television environment, the signal to be controlled as to phase is the horizontal-scanning signal and a capacitor 31 may be considered to be the source of this signal. Actually, it is convenient to observe the phase of a signal of sawtooth waveform which corresponds to the horizontal deflection and such a signal is readily derived from the flyback pulse developed in the deflection transformer and applied to capacitor 31 for integration. Hence, the drawing indicates a coupling capacitor 32 and resistor 33 connected between a terminal of image reproducer 17 and integrating capacitor 31. That terminal of the picture tube is, of course, a connection from the horizontal deflection windings of the yoke or from the output transformer of the horizontal system.

The arrangement further includes a second source for producing a signal to be used as a phase reference. Again, in the television environment, it is convenient to utilize the horizontal sync pulse as the phase reference and sync separator 20 serves as that source.

As is customary in a phase control arrangement there is a storage capacitor 34 which develops the phase control potential in accordance with the charge established on the condenser.

Two signal paths are available for charging the capacitor; the first path includes capacitor 31 and capacitor 34 connected in series with the emitter and collector junctions of transistor 23. Since the transistor is assumed to be a uni-lateral device, significant current flow between its collector and emitter electrodes occurs in only one sense and consequently this signal path may charge capacitor 34 in but one sense.

The second signal path for charging the capacitor in the opposite sense includes capacitor 31, the horizontal sync output of separator 20 and capacitor 34 connected in series across one of the other of the emitter and collector junctions. As shown, this path may be traced from the ground connection of separator 20, its horizontal sync output terminal, through a coupling capacitor 35, from base to the collector of transistor 23, storage capacitor 34, and integrating capacitor 31 to the ground connection.

A biasing network biases the transistor in a direction tending to prevent conduction. This network comprises a source of positive potential +B and series resistors 36, 37 having a common junction which connects to base 25 of the transistor. The polarity of the horizontal synchronizing pulse obtained from separator 20 for application to the base of the transistor is chosen to cause conduction selectively in either of the two aforedescribed charging paths for capacitor 34 in an amount determined by the sense and extent of deviation of the phase of the compared signals from a desired or predetermined reference phase condition. More particularly, the sync pulse is applied with negative polarity to base 25 of the transistor.

Finally, the detector has means for deriving from storage capacitor 34 a substantially direct current potential indicative of the phase changes of the compared signals from the desired phase condition. As shown, the filter comprises the parallel combination of a resistor 38 and a capacitor 40 having one terminal connected to collector electrode 24 and having another terminal returned to ground through the usual phasing network comprised of a resistor 41 and a capacitor 42.

The control potential obtained from this filter is applied to means for maintaining a desired phase relation of the compared signals. This means is a frequency-controlled relaxation oscillator which is also shown as of the transistor variety. It includes a second PNP transistor 45 similar to transistor 23. Its collector circuit includes a winding 46 of a transformer, shunted by a damping diode 53, and a bias source shown as a battery 47. The base-emitter circuit includes another transformer winding 48 inductively coupled to winding 46 to provide the feedback characteristic of a relaxation oscillator. The time constant circuit for determining the operating frequency comprises the parallel combination of a resistor 49 and a capacitor 50 having one terminal connected to ground and the other connected in series with winding 48. A speed-up diode 51 is branched across the time constant network to rapidly discharge stored carriers in the base when transistor 45 is cut off. The emitter circuit of the transistor is completed by a stabilizing resistor 52. As thus far described, the circuit of transistor 45 is essentially that of a conventional blocking oscillator which operates at a fixed nominal frequency but is subject to variations in operating frequency to achieve phase control.

This may be readily accomplished by providing for a change in the effective value of its time constant network 49, 50. Control of the effective time constant is introduced by still another transistor 60 which is similar to transistors 23 and 45 but of opposite gender, being of the NPN type. Its emitter is grounded, its collector is coupled to its base through a stabilizing resistor 61 and its base-emitter circuit includes network 41, 42 as well as an additional base resistor 63. The collector is connected to ground through a resistor 64 in series with resistor 49. This circuit arrangement finds the collector-emitter path of transistor 60 in shunt with resistor 49 so that a change in the effective resistance of the emitter collector path reflects a corresponding change in the effective resistance of time constant network 49, 50. The change in effective resistance presented by transistor 60 results from the application to the base electrode of the control potential derived through filter network 38–42.

The horizontal-scanning system is completed by a sawtooth generator 70 which is coupled to blocking oscillator 45 as a timing source.

In considering the operation of the frequency controlled oscillator, it will be understood that a signal of sawtooth waveform developed by integrating capacitor 31 is applied to the collector and emitter electrodes of transistor 23. The waveform is shown in curve C of FIGURE 2 centered about its alternating current axis D. Transistor 23 is normally cut off due to the bias developed across resistor 37 but this bias may be overcome by the application of the horizontal sync pulse shown in curve E. The synchronizing pulse occurs during the retrace time of the horizontal system which corresponds to the sharper sloped section of curve C. If it is timed to be present at the instant F when the sawtooth crosses its zero axis during retrace, there is no net collector-emitter voltage and no significant conduction in transistor 23. In other words, capacitor 34 receives no charge. This is the reference or desired relative phase of the two signals concurrently applied to the transistor.

Should their phase relation change so that a synchronizing pulse occurs at the time indicated at G, the collector 24 is at that instant back-biased which is the usual or normal arrangement for a transistor. Conduction then takes place from emitter to collector which is the direction in which the unilateral transistor conducts readily. Conduction in the transistor causes a charge of negative polarity to be developed on storage capacitor 34, i.e. terminal X becomes negative with respect to terminal Y. The polarity indicates that the change in phase from the preferred condition is on the lower side of the AC axis of FIGURE 2 and the magnitude of the charge is the manifestation of the extent of phase change.

Were the phase of the compared signals to be such that the sync pulse occurs at the instant H, it finds collector 24 forwardly biased but, since transistor 23 is unilaterally conductive, this does not result in any significant current flow in the emitter-collector circuit. Instead, diode action results in current flow from collector to base to develop a charge of positive polarity on capacitor 34. This indicates a phase change in the opposite sense, opposite from the first-described condition. Again, its magnitude manifests the extent of change in phase.

As a consequence the voltage available across network 41, 42 has a polarity and magnitude indicative of changes in phase of the compared signals from their desired reference phase.

Transistor 60 responds to this voltage to correct the phase relations by modifying the operating frequency of relaxation oscillator 45. Its function in that respect will be made clear from a consideration of the family of characteristic curves of FIGURE 3 which is a plot of collector current versus collector voltage for various values of base current. The broken construction line $V_{c1}$ indicates a constant collector voltage for transistor 60. This is the average value of voltage developed in time constant circuit 49, 50 and is always positive due to the base-emitter current in transistor 45. The sloping lines drawn from the origin to the intercepts of line $V_{c1}$ with the different characteristic curves designate the effective resistance presented by the emitter-collector circuit of transistor 60 for the various values of base current. In interpreting this representation, it will be noted that $I_{b1}$ is less than $I_{b2}$ which, in turn, is less than $I_{b3}$ and the effective resistance of the emitter-collector circuit decreases with increasing values of base current.

Transistor 60, being operated as a ground emitter, requires only a bias source in the emitter-collector circuit and the average potential of time constant network 49, 50 serves that function. The potential changes imposed on the base electrode in response to the operation of phase detector 23 reflect changes in the base current to modify the resistive component that transistor 60 contributes to time constant network 49, 50. The change of resistance of this network in response to the control potential developed by capacitor 34 of the phase detector adjusts the operating frequency of relaxation oscillator 45 to maintain the desired phase relation of synchronizing and scanning signals. As described above, the desired relation is one wherein the synchronizing pulse E occurs at the time the scanning signal is crossing its alternating current axis D during retrace.

If the sync pulse occurs at the time indicated G in FIGURE 2, the oscillator frequency is too high. The charge on capacitor 34 at terminal Y is positive and the base current of transistor 60 decreases. As a consequence, the effective resistance of the emitter-collector path through the transistor increases. This reduces the frequency of oscillator 45 to restore the reference phase condition. Conversely, should the sync pulse occur at time H, indicating that the oscillator frequency is too low, the base current of transistor 60 increases and the time constant of network 49, 50 decreases. This increases the oscillator frequency to restore the desired reference phase condition.

In one constructed phase control arrangement, cited merely by way of illustration and not limitation, the following parameters are successfully employed:

| | | |
|---|---|---|
| Resistor **33** | ohms | 100,000 |
| Resistor **36** | do | 30,000 |
| Resistor **37** | do | 82,000 |
| Resistor **38** | do | 56,000 |
| Capacitor **31** | micro microfarads | 1,000 |
| Capacitor **32** | microfarads | .05 |
| Capacitor **34** | do | 0.004 |
| Capacitor **35** | micro microfarads | 1500 |
| Capacitor **40** | do | 200 |
| Capacitor **42** | microfarads | 5 |
| Bias source +B | volts | +10 |
| Pulse amplitude of synchronizing pulse | do | 10 |
| Peak-to-peak amplitude of sawtooth signal | do | 14 |
| Operating frequency of oscillator **45** | c.p.s. | 15,750 |
| Range of phase control potential | volts | ±1.5 |
| Transistor **30** | Type | 2N35 |
| Transistor **45** | Type | 2N1126 |
| Transistor **60** | Type | 2N167 |

The modification of FIGURE 4 is very similar to that of FIGURE 1 but differing therefrom in two important respects. The parameters in the arrangement of FIGURE 4 have been selected so that this form of phase detector is particularly well suited, from the standpoint of impedance, to control the usual form of reactance tube circuit. Also, capacitor 31 in FIGURE 4 serves two functions. It is both the integrating capacitor for developing the sawtooth signal and the storage capacitor for accumulating a charge which may vary in both magnitude and sense with phase changes of the compared signals from a reference phase condition. The operation of the system in this respect may be readily understood if it is assumed that the connection from the collector of transistor 23 to resistor 38 has been broken.

As with the system of FIGURE 1, if the sync pulse arrives at the instant the sawtooth signal developed by capacitor 31 is crossing its A.-C. axis, there is no net voltage across the emitter and collector, no collector current flows and no charge is established on capacitor 31 representing a phase-correction potential.

Should the sync pulse arrive after the sawtooth signal has crossed its A.-C. axis, during horizontal retrace, however, current flows from emitter to collector of transistor 23 and establishes a charge represented by the broken horizontal line $+E_c$ in FIGURE 5*a*. Of course, the line $E_c$ indicates an average value of the control potential which is positive relative to ground.

When the sync pulse arrives before the sawtooth crosses its A.-C. axis during retrace, the control potential developed by capacitor 31 is designated $-E_c$ in FIGURE 5*b*. Again, this is an average value but it is negative relative to ground since it results from diode action between collector and base in transistor 23.

Accordingly, it may be seen that capacitor 31, in addition to integrating the horizontal flyback pulse to form a sawtooth signal, also stores a charge which reflects the change in phase from a reference phase condition. The sense of the charge, or the polarity of phase-control potential, indicates the direction of phase change and the magnitude of charge shows the extent of change. The systems of FIGURES 1 and 4 are the same in that each develops a phase-control potential that varies as to polarity and magnitude.

In FIGURE 4, elements 34, 38, 41 and 42 serve as a filter to present to terminal A the D.-C. component or average value of the voltage developed by capacitor 31. It is this voltage which may be used to effect frequency and phase control of an oscillation generator.

Since the control potential may change in polarity as wtlel well as magnitude, the use of the arrangement of FIGURE 4 to control a rectance control tube requires that the input circuit of the reactance control tube have an established operating bias which may be varied from a reference value, in either direction, in accordance with the output control voltage obtained in the phase detector.

A representative set of circuit values for the phase detector arrangement of FIGURE 4 is as follows:

| | | |
|---|---|---|
| Resistor **29** | ohms | 3,300 |
| Resistor **33** | do | 100,000 |
| Resistor **36** | do | 150,000 |
| Resistor **37** | do | 15,000 |
| Resistor **38** | megohms | 1 |
| Resistor **41** | ohms | 120,000 |
| Capacitor **31** | microfarads | 0.001 |
| Capacitor **34** | do | 0.001 |
| Capacitor **35** | micro microfarads | 120 |
| Capacitor **42** | microfarads | 0.047 |
| Range of phase control potential | volts | ±4 |

The described arrangement has the distinct advantage that it does not require symmetrical transistors but may indeed advantageously use the conventional unilateral transistor. The arrangement may accommodate large capacitances which support large average values of current and provide effective phase control. A very special attribute of the arrangement is that it may be scaled impedance-wise to adapt itself to the requirements of the stage that it drives. Where it is associated with a driven stage which is a low impedance device, and this is characteristic of most transistor stages, the phase control system may be scaled to present a moderate or low matching terminal impedance. At the same time, it is just as convenient to scale the phase control network to have a high terminal impedance as in the case of FIGURE 4 when it is intended to drive a tube stage.

While described as responding to horizontal pulses, the phase control network of FIGURES 1 and 4 is not at all disturbed by the field synchronizing pulses of a composite television signal. The input capacitor 35 and resistor 37 serve to define a differentiating network which responds to the long duration field synchronizing pulses to the end that the phase control utilizes such pulses in essentially the same fashion as it responds to horizontal pulses.

While particular embodiments of the invention have been shown and described, it will be obvious to those skilled in the art that changes and modifications may be made without departing from the invention in its broader aspects, and therefore, the aim in the appended claims is to cover all such changes and modificatons as fall within the true spirit and scope of the invention.

We claim:

1. A phase-controlled system comprising: a semiconductor device having a base zone of one conductivity interposed between emitter and collector zones of opposite conductivity and constituting therewith base-emitter and base-collector junctions; a first source for producing an alternating-current signal the phase of which is to be measured; a second source for producing a signal to be used as a phase reference; a storage capacitor; a first signal path, including said first source and said capacitor connected in series with said emitter and collector junctions, for charging said capacitor in one sense; a second signal path, including said first and second sources and said capacitor connected in series across only one of said base-emitter and base-collector junctions, for charging said capacitor in the opposite sense; said second source being poled to cause conduction selectively in one of said signal paths and in an amount determined by the sense and extent of deviation of said signals from a predetermined phase condition; and filter means for deriving from said capacitor a substantially direct current potential representing phase changes of said signals from said predetermined phase condition.

2. A phase-controlled system comprising: a semiconductor device having a base zone of one conductivity interposed between emitter and collector zones of opposite conductivity and constituting therewith base-emitter and base-collector junctions, said device exhibiting a higher conductivity for current flow in one direction between said emitter and collector zones than in the opposite direction; a first source for producing an alternating-current signal the phase of which is to be measured; a second source for producing a signal to be used as a phase reference; a storage capacitor; a first signal path, including said first source and said capacitor connected in series with said emitter and collector junctions, for charging said capacitor in one sense in response to current flow in said one direction; a second signal path, including said first and second sources and said capacitor connected in series across only one of said base-emitter and base-collector junctions, for charging said capacitor in the opposite sense; said second source being poled to cause conduction selectively in one of said signal paths and in an amount determined by the sense and extent of deviation of said signals from a predetermined phase condition; and filter means for deriving from said capacitor a substantially direct current potential representing phase changes of said signals from said predetermined phase condition.

3. A phase-controlled system comprising: a semiconductor device having a base zone of one conductivity interposed between emitter and collector zones of opposite conductivity and constituting therewith base-emitter and base-collector junctions, said device exhibiting a higher conductivity for current flow from said emitter to said collector zone than in the opposite direction; a first source for producing an alternating-current signal the phase of which is to be measured; a second source for producing a signal to be used as a phase reference; a storage capacitor; a first signal path, including said first source and said capacitor connected in series with said emitter and collector junctions, for charging said capacitor in one sense in response to current flow from said emitter to said collector zone; a second signal path, including said first and second sources and said capacitor connected in series across only one of said base-emitter and base collector junctions, for charging said capacitor in the opposite sense; said second source being poled to cause conduction selectively in one of said signal paths and in an amount determined by the sense and extent of deviation of said signals from a predetermined phase condition; and filter means for deriving from said capacitor a substantially direct current potential representing phase changes of said signals from said predetermined phase condition.

4. A phase-controlled system for a television receiver having a scanning arrangement comprising: a semiconductor device having a base zone of one conductivity interposed between emitter and collector zones of opposite conductivity and constituting therewith base-emitter and base-collector junctions; biasing means tending to prevent conduction in said device; a first source for producing an alternating-current signal representing a scanning cycle of the receiver the phase of which is to be controlled; a second source for producing a synchronizing pulse representing the desired timing of said scanning cycle; a storage capacitor; a first signal path, including said first source and said capacitor connected in series with said emitter and collector junctions, for charging said capacitor in one sense; a second signal path, including said first and second sources and said capacitor connected in series across only one of said base-emitter and base-collector junctions, for charging said capacitor in the opposite sense; said second source producing a synchronizing pulse of such amplitude and polarity as to overcome said biasing means and cause conduction selectively in one of said signal paths and in an amount determined by the sense and extent of deviation of said signals from a predetermined phase condition; filter means for deriving from said capacitor a substantially direct current potential representing phase changes of said signals from said predetermined phase condition; and means responsive to said potential for maintaining said predetermined phase condition.

5. A phase-controlled system for a television receiver having a scanning arrangement comprising: a semiconductor device having a base zone of one conductivity interposed between emitter and collector zones of opposite conductivity and constituting therewith base-emitter and base-collector junctions; biasing means tending to prevent conduction in said device; a first source, including a blocking oscillator having a resistance-capacitance network determining its operating frequency, for producing an alternating-current signal representing a scanning cycle of the receiver the phase of which is to be controlled; a second source for producing a synchronizing pulse representing the desired timing of said scanning cycle; a storage capacitor; a first signal path, including said first source and said capacitor connected in series with said emitter and collector junctions, for charging said capacitor in one sense; a second signal path, including said first and second sources and said capacitor connected in series across only one of said base-emitter and base-collector junctions, for charging said capacitor in the opposite sense; said second source producing a synchronizing pulse of such amplitude and polarity as to overcome said biasing means and cause conduction selectively in one of said signal paths and in an amount determined by the sense and extent of deviation of said signals from a predetermined phase condition; filter means for deriving from said capacitor a substantially direct current potential representing phase changes of said signals from said predetermined phase condition; a second semiconductor device, having a base zone of one conductivity interposed between emitter and collector zones of opposite conductivity, coupled to said oscillator to vary the effective resistance of said network as a function of conductivity of said second device; and means for applying said direct current potential to said second device to control the conductivity thereof and maintain said predetermined phase condition.

6. A phase-controlled system for a television receiver having a scanning arrangement comprising: a semiconductor device having a base zone of one conductivity interposed between emitter and collector zones of opposite conductivity and constituting therewith base-emitter and base-collector junctions; biasing means tending to prevent conduction in said device; a first source, including a blocking oscillator having a resistance-capacitance network determining its operating frequency, for producing an alternating-current signal representing a scanning cycle of the receiver the phase of which is to be controlled; a second source for producing a synchronizing pulse representing the desired timing of said scanning cycle; a storage capacitor; a first signal path, including said first source and said capacitor connected in series with said emitter and collector junctions, for charging said capacitor in one sense; a second signal path, including said first and second sources and said capacitor connected in series across only one of said base-emitter and base-collector junctions, for charging said capacitor in the opposite sense; said second source producing a synchronizing pulse of such amplitude and polarity as to overcome said biasing means and cause conduction selectively in one of said signal paths and in an amount determined by the sense and extent of deviation of said signals from a predetermined phase condition; filter means for deriving from said capacitor a substantially direct current potential representing phase changes of said signals from said predetermined phase condition; a second semiconductor device, having a base zone of one conductivity interposed between emitter and collector zones of opposite conductivity; means for coupling said emitter and collector zones of said second device across said network of said oscillator to bias said second device forwardly and to vary the effective resistance of said network as a function of conductivity of said second device; and means for applying said direct current potential to said base zone of said second device to control the conductivity thereof and maintain said predetermined phase condition.

7. A phase-controlled system comprising: a semiconductor device having a base zone of one conductivity interposed between emitter and collector zones of opposite conductivity and constituting therewith base-emitter and base-collector junctions; a first source, including a storage capacitor, for producing an alternating-current signal the phase of which is to be measured; a second source for producing a signal to be used as a phase reference; a first signal path, including said capacitor connected in series with said emitter and collector junctions for charging said capacitor in one sense; a second signal path, including said second source and said capacitor connected in series across only one of said base-emitter and base-collector junctions, for charging said capacitor in the opposite sense; said second source being poled to cause conduction selectively in one of said signal paths and in an amount determined by the sense and extent of deviation of said signals from a predetermined phase condition; and filter means for deriving from said capacitor a substantially direct current potential representing phase changes of said signals from said predetermined phase condition.

References Cited by the Examiner

UNITED STATES PATENTS

| | | | |
|---|---|---|---|
| 2,766,380 | 10/56 | Kroger | 331—8 |
| 2,876,382 | 3/59 | Sziklai | 329—103 |
| 3,031,625 | 4/62 | Bickford | 331—8 |
| 3,038,033 | 6/62 | Kingsford—Smith | 178—69.5 |

ROY LAKE, *Primary Examiner.*

JOHN KOMINSKI, *Examiner.*